United States Patent
Garziera

(10) Patent No.: US 7,789,259 B2
(45) Date of Patent: Sep. 7, 2010

(54) COVER-HANDLE ASSEMBLY FOR A KITCHEN VESSEL

(75) Inventor: Roberto Vincenzo Garziera, Appiano Gentile (IT)

(73) Assignee: Ballarini Paolo & Fieli S.p.A., Mantovano (IT)

( * ) Notice: Subject to any disclaimer, the term of this patent is extended or adjusted under 35 U.S.C. 154(b) by 680 days.

(21) Appl. No.: 11/604,446

(22) Filed: Nov. 27, 2006

(65) Prior Publication Data
US 2007/0145054 A1    Jun. 28, 2007

(30) Foreign Application Priority Data
Nov. 30, 2005   (IT)   .................. MI20050411 U

(51) Int. Cl.
*B65D 45/00*    (2006.01)
*B65D 51/12*    (2006.01)
*B65D 41/16*    (2006.01)
*B65D 25/10*    (2006.01)

(52) U.S. Cl. .................. 220/212.5; 220/317; 220/318; 220/305; 220/793; 220/766

(58) Field of Classification Search .............. 220/212.5, 220/317, 318, 846, 793, 766, 805; 215/305, 215/765
See application file for complete search history.

(56) References Cited

U.S. PATENT DOCUMENTS

|   25,466 | A | * | 9/1859  | Gould ........................ 126/220 |
| 265,403  | A | * | 10/1882 | Gaylord ..................... 210/245 |
| 998,557  | A | * | 7/1911  | Selleck ........................ 16/446 |
| 3,727,265| A | * | 4/1973  | Camp .......................... 16/444 |
| 3,827,596| A | * | 8/1974  | Powers, Jr. .................. 220/231 |
| 4,157,763| A | * | 6/1979  | Betlejewski et al. ........ 220/761 |
| 4,360,123| A | * | 11/1982 | Blease ........................ 220/323 |
| 5,285,917| A | * | 2/1994  | Hoffmann ................ 220/212.5 |
| 5,579,932| A | * | 12/1996 | Drozd et al. ................ 215/207 |
| 5,803,297| A | * | 9/1998  | Vasquez .................. 220/212.5 |

* cited by examiner

*Primary Examiner*—Anthony Stashick
*Assistant Examiner*—Kareen Rush
(74) *Attorney, Agent, or Firm*—Kirschstein, et al.

(57) ABSTRACT

A cover-handle assembly for a kitchen vessel comprises a cover element having an outer central support element swingably housing plate gripping means which, in a rest position thereof, adjoin the surface of the cover element and, in a use position thereof, project with a slanted attitude from the cover element surface.

4 Claims, 4 Drawing Sheets

COVER-HANDLE ASSEMBLY FOR A KITCHEN VESSEL

BACKGROUND OF THE INVENTION

The invention relates to a cover-handle assembly for a kitchen vessel.

A kitchen vessel cover including a projecting gripping knob arranged at the center of the cover, is already known in the prior art.

Such a provision of the central projecting gripping knob represents a drawback since the gripping knob, projecting from the cover, requires a comparatively large space for arranging, for example, the cover in a washing dish machine or in a drawer of a kitchen furniture piece.

In further prior kitchen vessel covers, the cover knobs or handles radially project from the cover circumference.

However, also this cover embodiment requires a comparatively large space, both as the kitchen vessel is arranged on a heating source, and as the kitchen vessel cover is arranged in a wash dish machine or stored in a drawer.

SUMMARY OF THE INVENTION

Accordingly, the aim of the invention is to overcome the above mentioned drawbacks of the prior art, by providing a kitchen vessel cover which, in a non-use position thereof, does not comprise any gripping members projecting from the cover.

The above mentioned aim is achieved by a kitchen vessel cover-handle assembly comprising a cover having an outer central supporting body swingably supporting plate gripping means which, in a rest position thereof, adjoin a surface of the cover and which, in a use position thereof, project with a slanted attitude from said surface of said cover.

Advantageously, each said gripping means or element comprises a bulging, concave, surface, which, in a rest position thereof, is substantially parallel to the cover surface.

BRIEF DESCRIPTION OF THE DRAWINGS

Further advantages of the invention will become more apparent hereinafter from the following disclosure, the dependent claims and the accompanying drawings.

The subject matter of the present invention will be disclosed in a more detailed manner hereinafter and shown in the accompanying drawings, where.

DESCRIPTION OF THE PREFERRED EMBODIMENT

Figure 1:
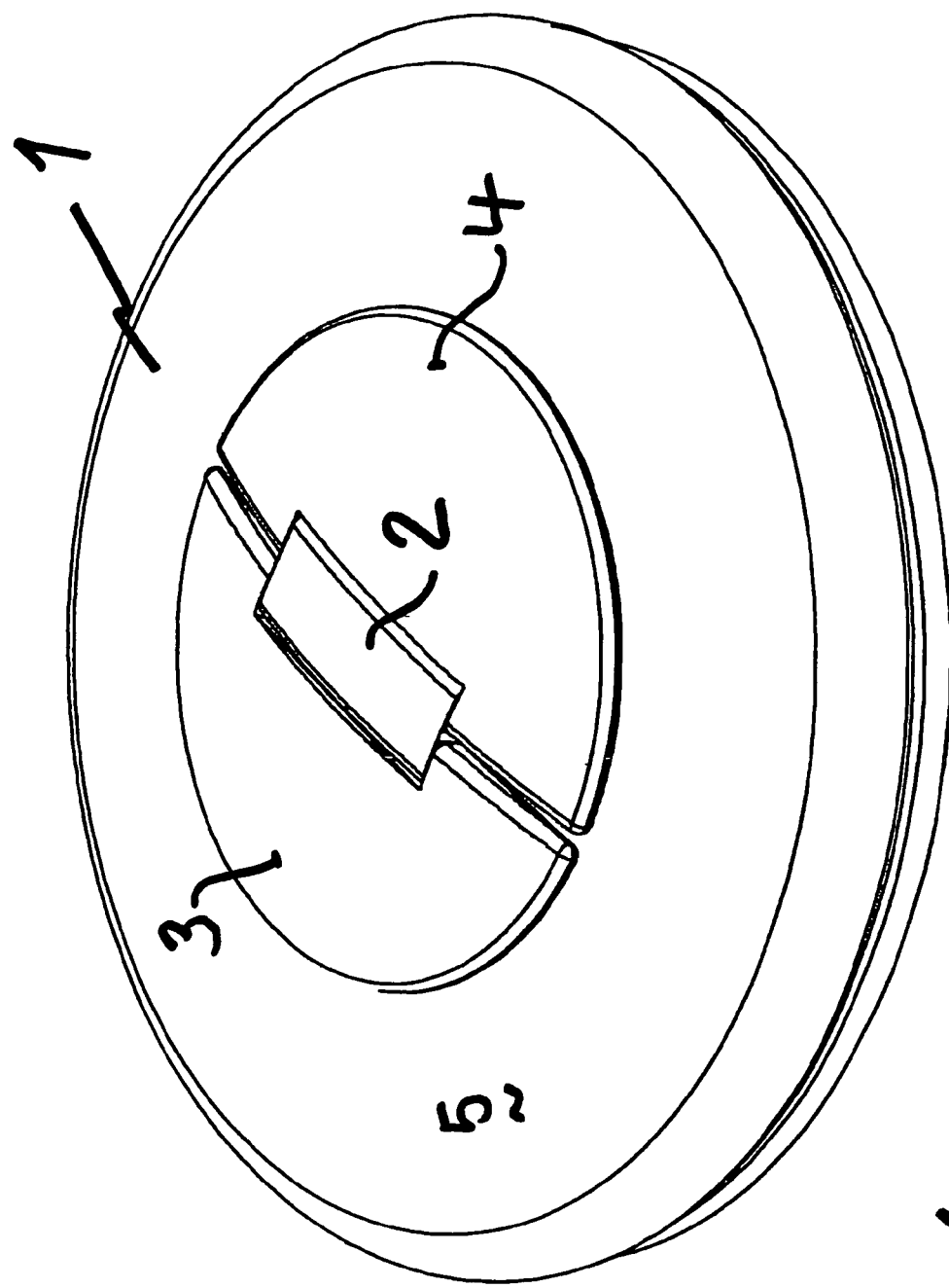
FIG. 1 is a top perspective view of the kitchen vessel cover with its gripping elements arranged in a rest position thereof.

With reference to FIG. 1, the cover 1, which may have a circular, square, rectangular or oval configuration, comprises, at the center thereof, a substantially flat supporting body 2.

To said supporting body 2 gripping elements 3, and 4 are pivotably coupled. As shown, each gripping element 3 and 4 is formed by a semicircular plate.

It should be however apparent that said gripping elements 3 and 4 may have any other desired geometrical configuration. As shown in FIG. 1, the two gripping elements 3 and 4, in a rest position thereof, adjoin the surface 5 of the cover 1, thereby they will not practically occupy any useful space above the surface 5 of the cover.

Actually, said gripping elements will occupy, either in an axial or in a vertical direction, a space which is slightly larger than their thickness.

Figure 2:
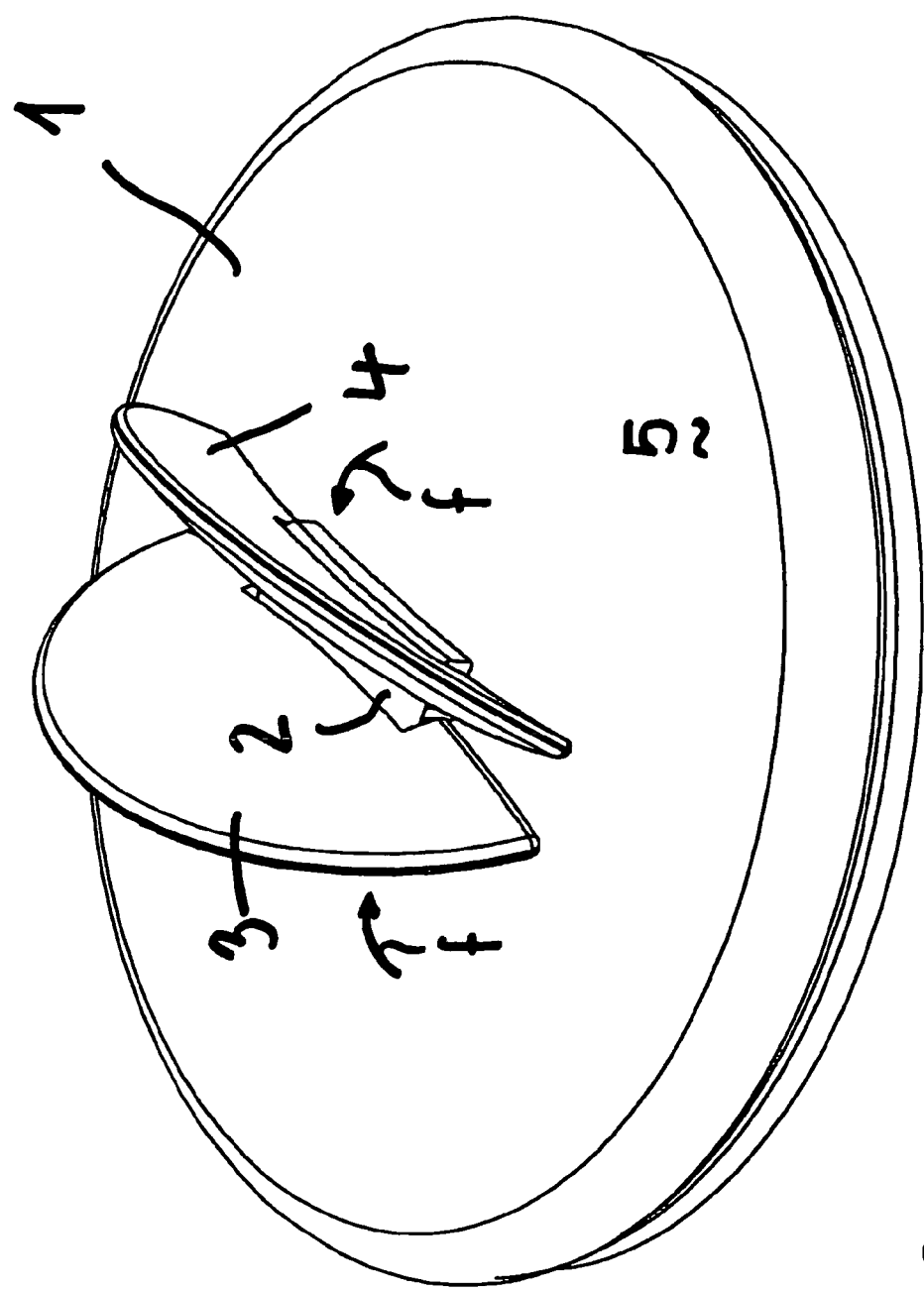
FIG. 2 is a further top perspective view of the cover with the gripping elements thereof in a use position.

FIG. 2 shows the cover 1 and gripping elements 3 and 4 oscillated about swinging shafts or pivot pins engaged in the supporting body 2.

The driving mechanism, which will be disclosed in a more detailed manner hereinafter, is designed to allow to arrange the gripping elements 3 and 4 at a position slanted or inclined with respect to a vertical plane (see the arrows f).

Figure 3:
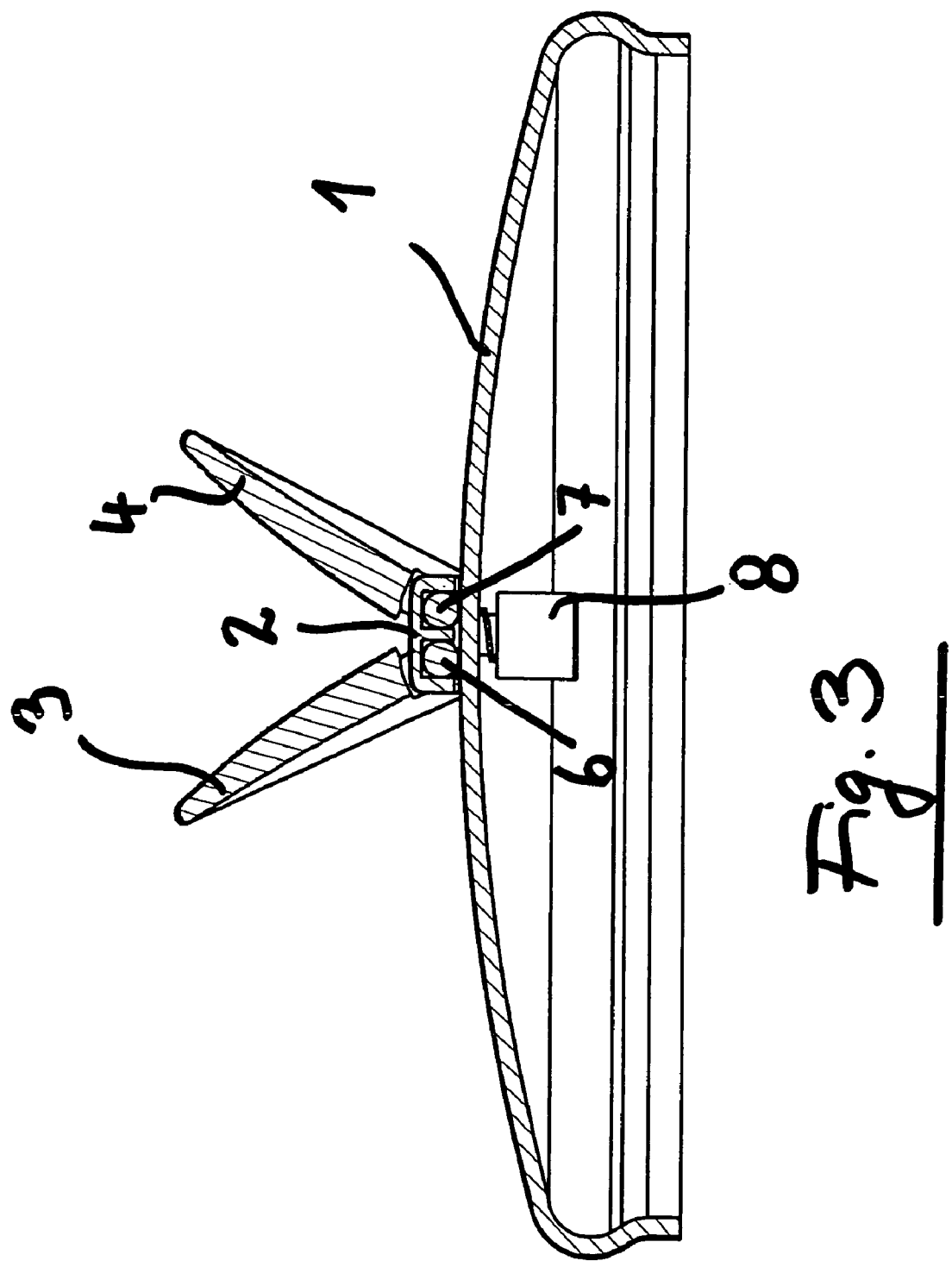
FIG. 3 is a cross-sectional view of the cover and with the gripping elements in a use position thereof.

FIG. 3 is a cross-sectional view showing a cross section of the cover 1.

At a central portion of the cover a supporting body or element 2, for example of a flat parallelepipedal shape, is arranged for swingably housing, through two pivot pins 6 and 7, the gripping elements 3 and 4 forming the subject novel handle.

The supporting body 2 is operatively coupled to a drive mechanism 8, fixedly arranged inside the cover 1 and which will be disclosed in a more detailed manner hereinafter.

Figure 4:
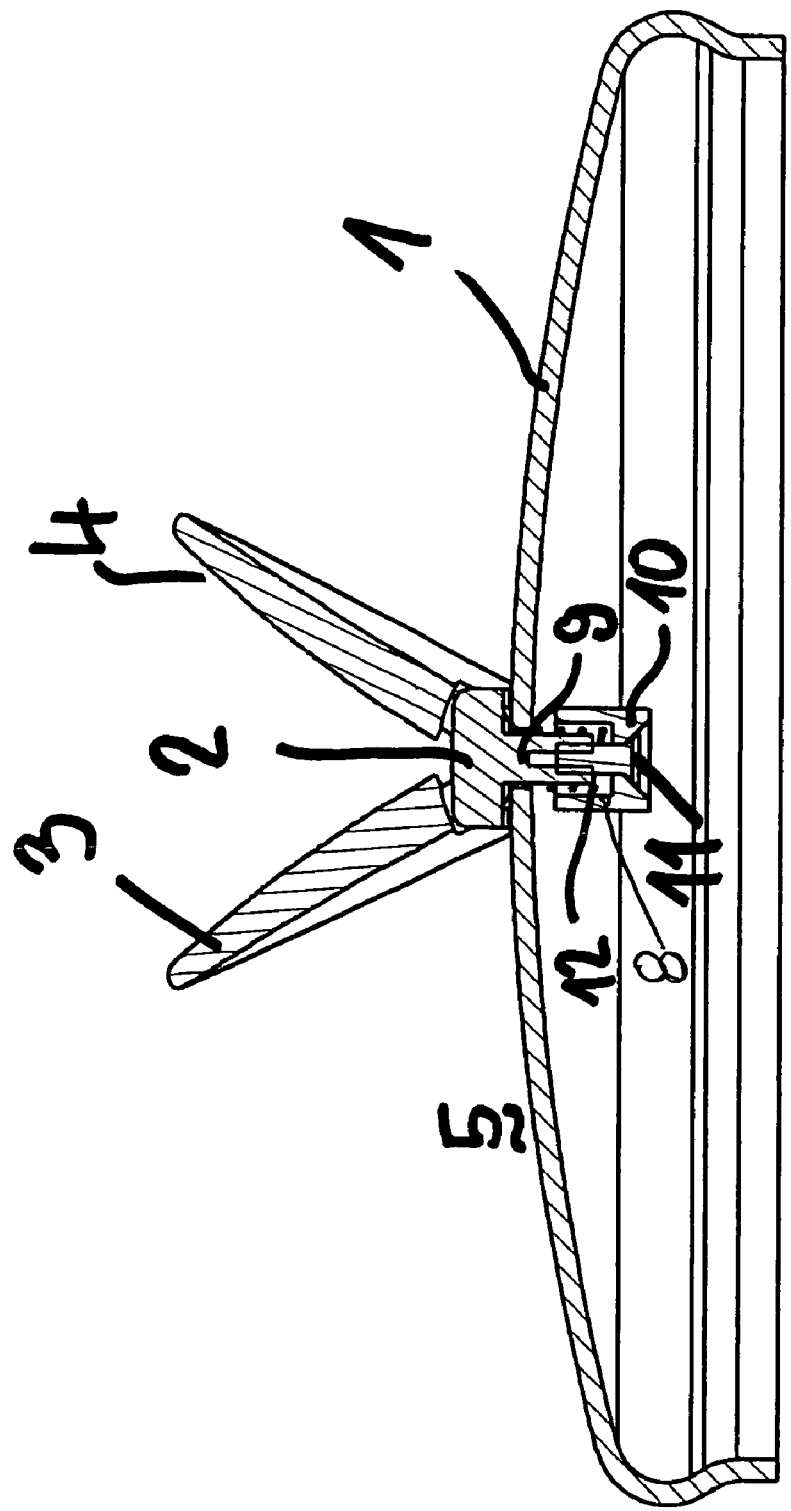
FIG. 4 is a further cross-sectional view of the cover, the gripping elements and gripping element supporting means.

As shown in FIG. 4, the two gripping elements or handles 3 and 4 of the cover are coupled through cross pins (see FIG. 3) to the supporting body 2, said supporting body 2 comprising a supporting element stem 9 passing through the wall of the cover 1 and being engaged in a cavity of a cup element 10 fixed to said stem by a clamping screw 11.

Between the inside face of the cover 1 and floor of the cup element or body 10 a resilient means, for example a spring 12 or a silicone body, tending to drive the body of the supporting body 2 permanently toward the surface 5 of the cover 1, is arranged.

Said spring 12 is so designed as to tend to hold the gripping elements or handles 3 and 4 in their rest position joining the cover surface 5 (see FIG. 1).

To bring the two handles 3 and 4 to their use position, as shown in FIG. 2, said handles are upward oscillated about the pivot pins 6 and 7 and against the counter-biasing of the spring 12.

The invention claimed is:

1. A handle assembly for a kitchen vessel cover having an outer wall surface, comprising:

a central support mounted on the cover, the central support having an outer member mounted exteriorly of the cover, a stem extending through the cover, an inner member mounted on the stem interiorly of the cover, and means for constantly urging the outer member into contact with the outer wall surface of the cover; and a pair of gripping plates mounted on the central support for pivoting movement about horizontal pivot axes between a gripping position in which the gripping plates diverge apart in radial directions outwardly away from the respective pivot axes to serve as a handle, and a storage position in which the gripping plates overlap, and rest on top of, the outer wall surface to minimize storage space.

2. The handle assembly of claim 1, wherein each gripping plate has a semicircular shape.

3. The handle assembly of claim 1, and pivot pins extending along the respective pivot axes for pivotably coupling the gripping plates to the cover, and wherein the central support has compartments for respectively receiving the pivot pins.

4. The handle assembly of claim 1, wherein the outer wall surface of the cover is curved, and wherein each gripping plate has a curved inner surface having a curvature of complementary contour to the curved outer wall surface of the cover to lie in surface engagement with the curved outer wall surface in the storage position.

* * * * *